H. D. CRESS.
Draft-Equalizer.

No. 202,705. Patented April 23, 1878.

WITNESSES:
Henry N. Miller
C. Sedgwick

INVENTOR:
H. D. Cress
BY Munn & Co
ATTORNEYS.

UNITED STATES PATENT OFFICE.

HENRY D. CRESS, OF CROMWELL, INDIANA, ASSIGNOR TO HIMSELF AND SAMUEL C. MAKEMSON, OF SAME PLACE.

IMPROVEMENT IN DRAFT-EQUALIZERS.

Specification forming part of Letters Patent No. 202,705, dated April 23, 1878; application filed April 2, 1878.

*To all whom it may concern:*

Figure 1:
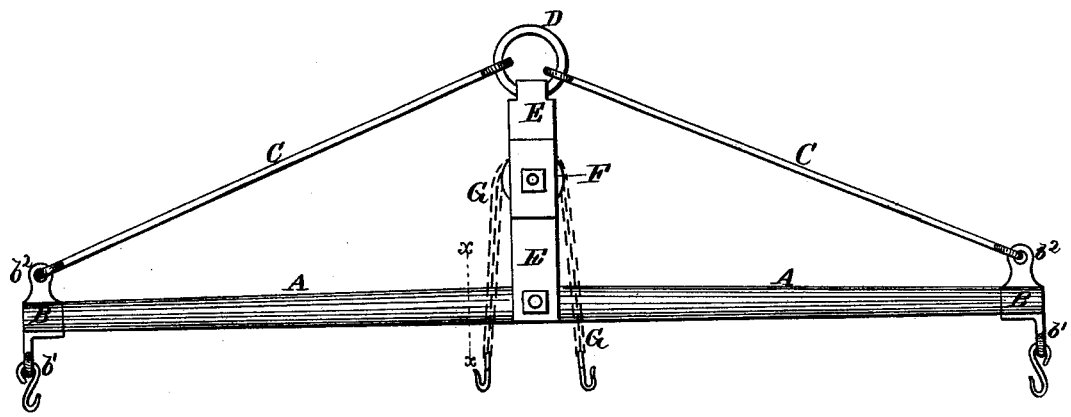
Figure 2:
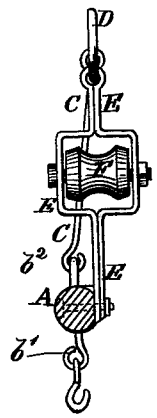

Be it known that I, HENRY D. CRESS, of Cromwell, in the county of Noble and State of Indiana, have invented a new and useful Improvement in Draft Bar or Spreader, of which the following is a specification:

Figure 1 is a top view of my improved draft-bar. Fig. 2 is a detail section of the same, taken through the line $x\ x$, Fig. 1.

Similar letters of reference indicate corresponding parts.

The object of this invention is to furnish an improved draft bar or spreader for attaching horses to the draft without the use of double-trees and whiffletrees, and in such a way that the draft will be equalized between the horses, and which at the same time shall be simple in construction, strong, durable, and compact.

The invention consists in the combination of the bar, the clips, the braces, the ring, the bar or plate, the pulley, and the chain with each other, as hereinafter fully described.

A represents a bar of wood of suitable length and size, to the ends of which are attached clips B. Upon the forward sides of the clips B are formed eyes or hooks $b^1$ to receive the outer traces of the horses. Upon the rear sides of the clips B are formed eyes $b^2$, to which are pivoted the outer ends of the braces C, the inner ends of which are pivoted to the ring D attached to the rear end of the bar or plate E. The bar or plate E has a cavity formed in it, in which is pivoted a pulley, F, as shown in Figs. 1 and 2.

The forward end of the bar or plate E is securely bolted to the center of the bar A. Around the pulley F passes a chain, G, which has hooks formed upon its ends to receive the inner traces of the horses, and is made of such a length that the said hooks may be about in line with the hooks or eyes $b^1$ of the clips B.

By this construction there will be no whiffletrees to be in the way or to get under the horses' feet, and at the same time the chain G will allow the bar A to adjust itself in turning, so as to keep its ends out of the way of the horses' feet.

By this construction, also, the draft-bar will be simple and compact, may be conveniently handled, and will be strong and durable.

Having thus described my invention, I claim as new and desire to secure by Letters Patent—

The combination of the bar A, the clips B, the braces C, the ring D, the bar or plate E, the pulley F, and the chain G with each other, substantially as herein shown and described.

HENRY DANIEL CRESS.

Witnesses:
NEWTON W. GREEN,
LINDSEY MAKEMSON.